C. F. ROTH & R. A. KELLER.
AUTOMATIC PHOTOGRAPHING AND DEVELOPING MACHINE.
APPLICATION FILED SEPT. 22, 1914.
1,177,539. Patented Mar. 28, 1916.
6 SHEETS—SHEET 1.
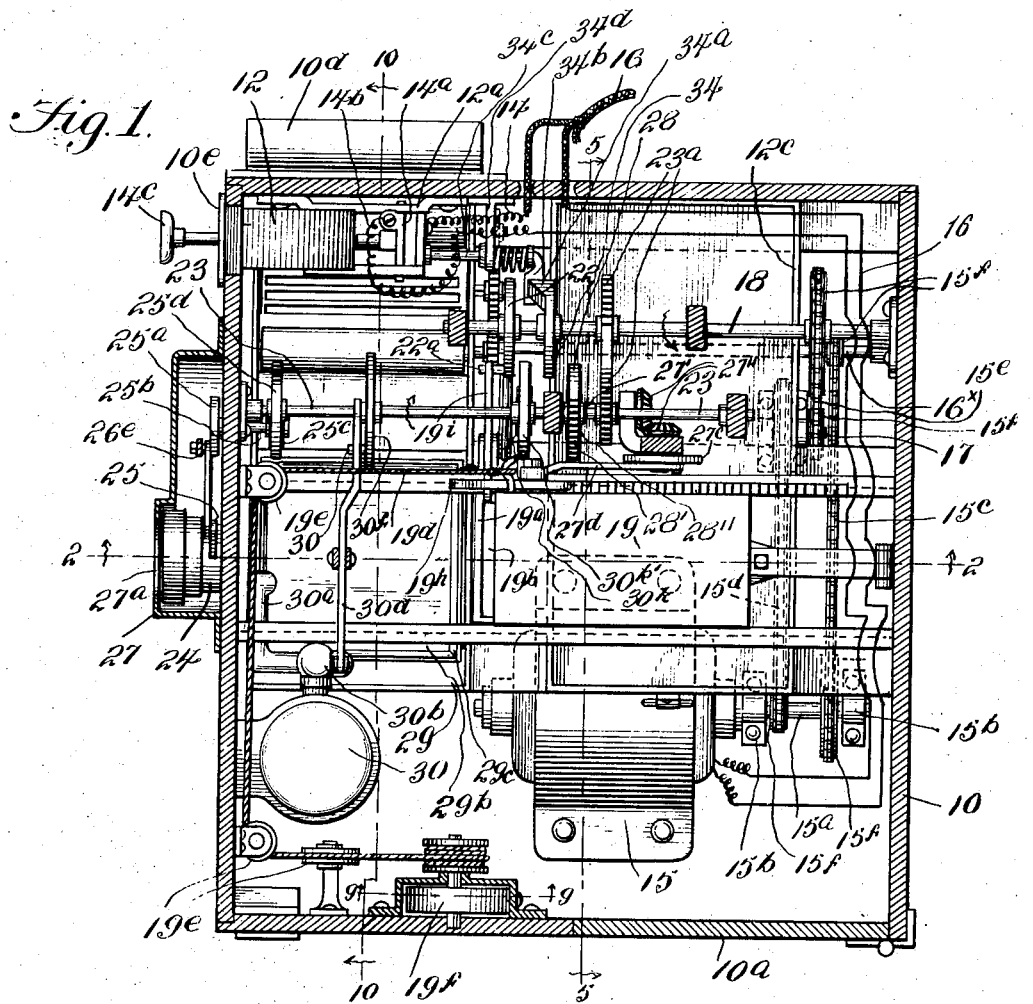
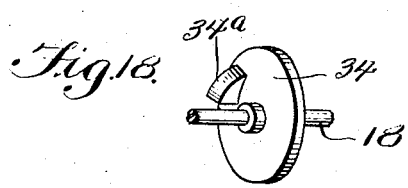
Witnesses
J. T. L. Wright
Inventors
C. F. Roth
R. A. Keller
By Victor J. Evans
Attorney

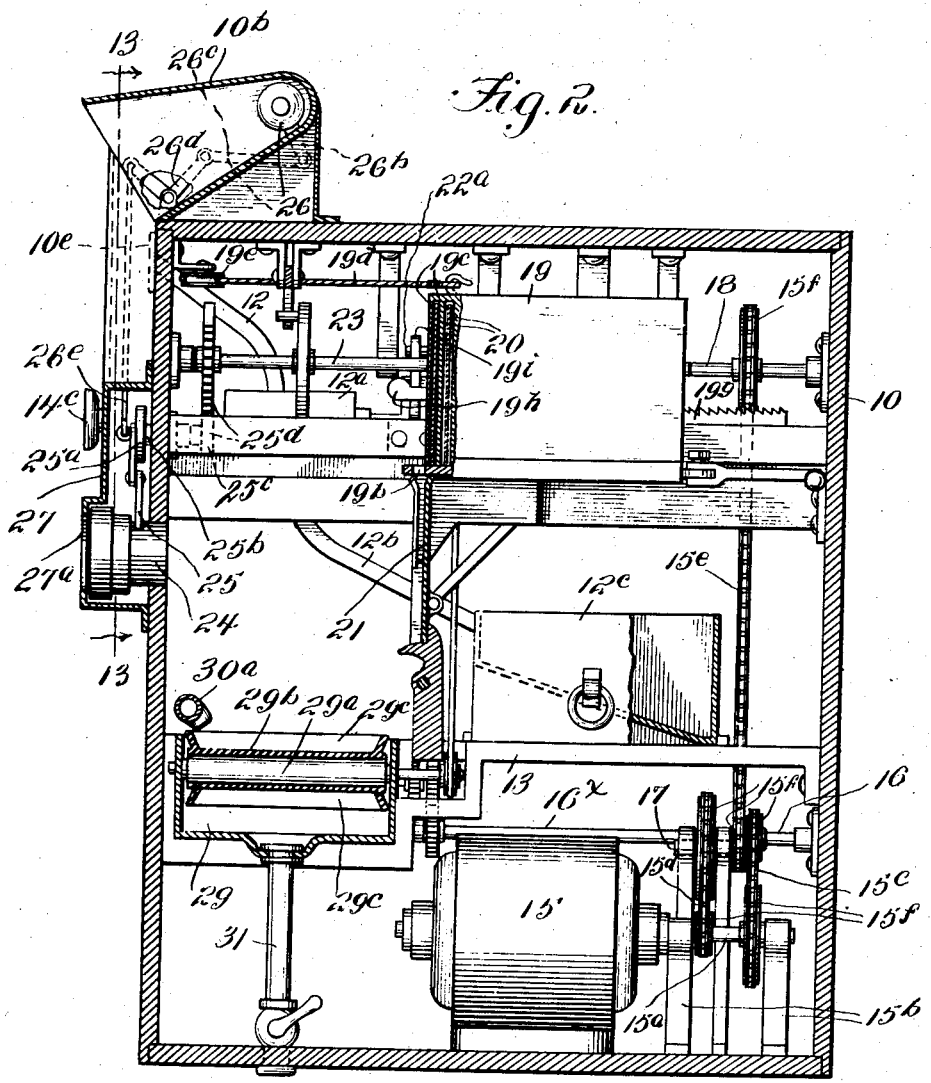

C. F. ROTH & R. A. KELLER.
AUTOMATIC PHOTOGRAPHING AND DEVELOPING MACHINE.
APPLICATION FILED SEPT. 22, 1914.
1,177,539.
Patented Mar. 28, 1916.
6 SHEETS—SHEET 3.
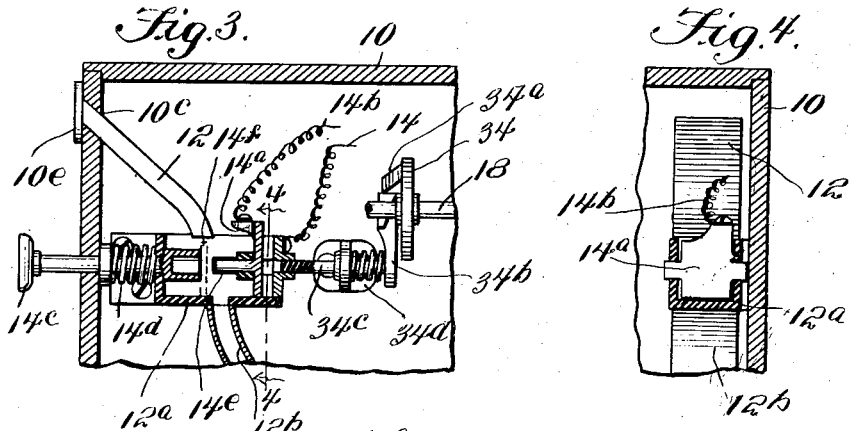
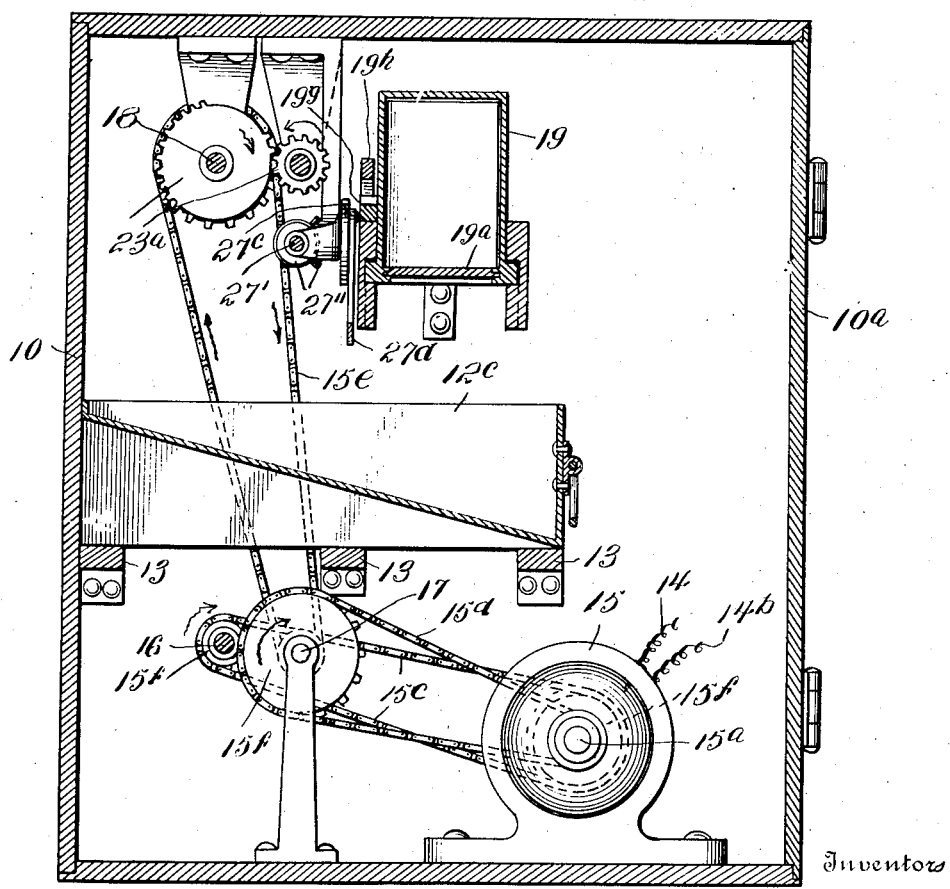

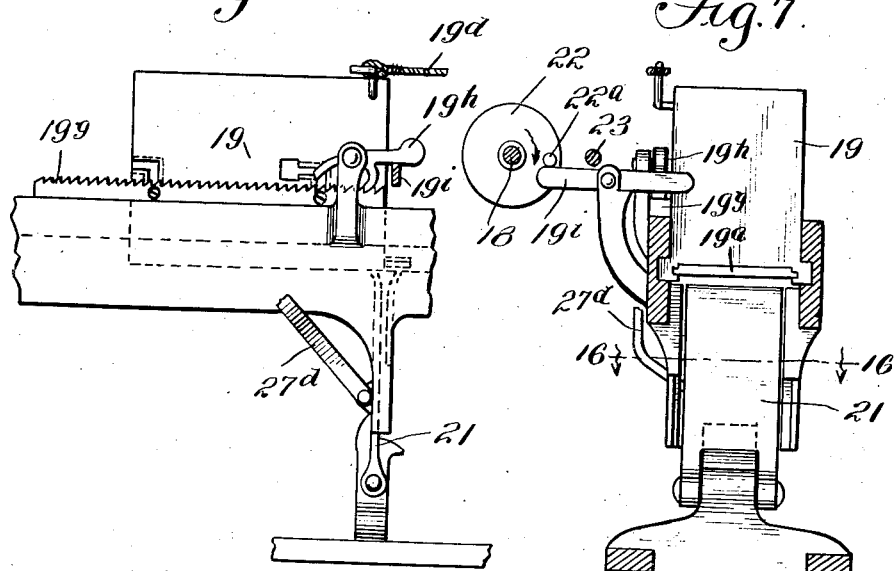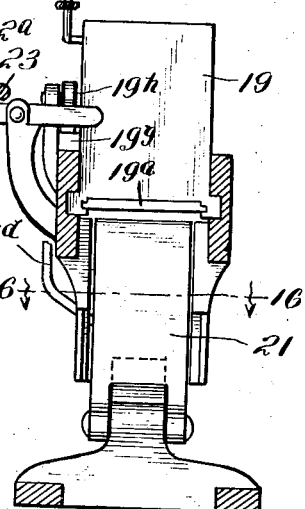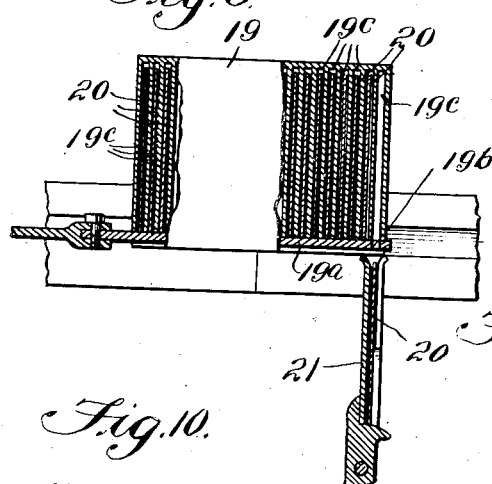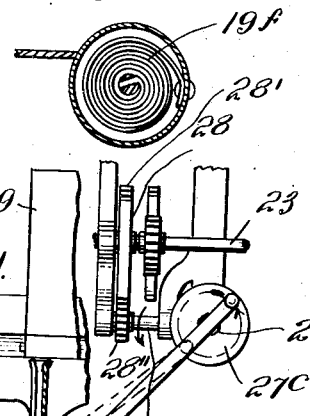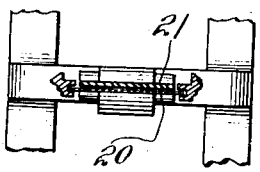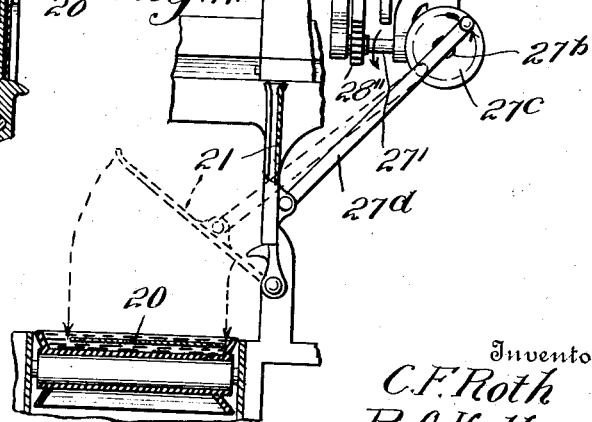

C. F. ROTH & R. A. KELLER.
AUTOMATIC PHOTOGRAPHING AND DEVELOPING MACHINE.
APPLICATION FILED SEPT. 22, 1914.
1,177,539.
Patented Mar. 28, 1916.
6 SHEETS—SHEET 6.
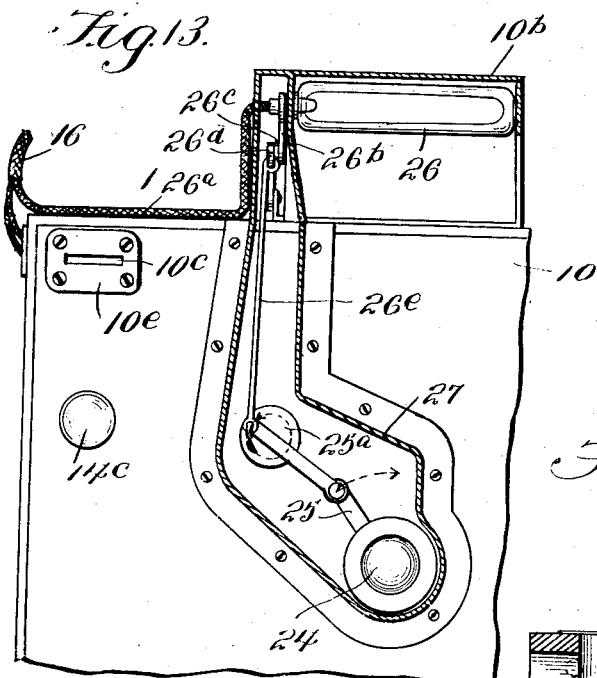
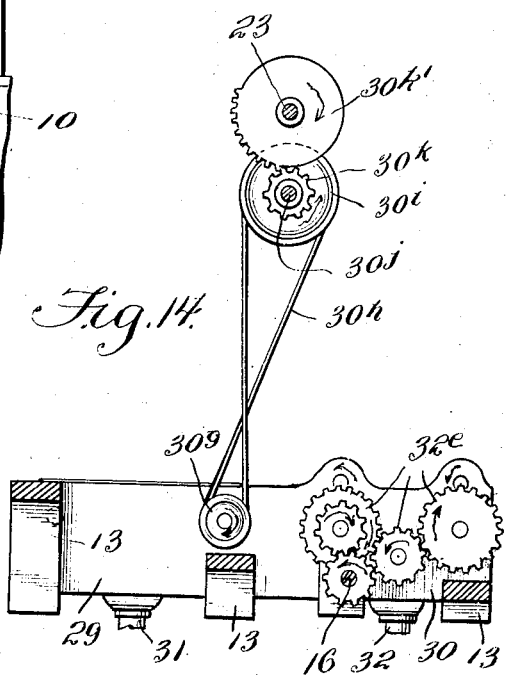
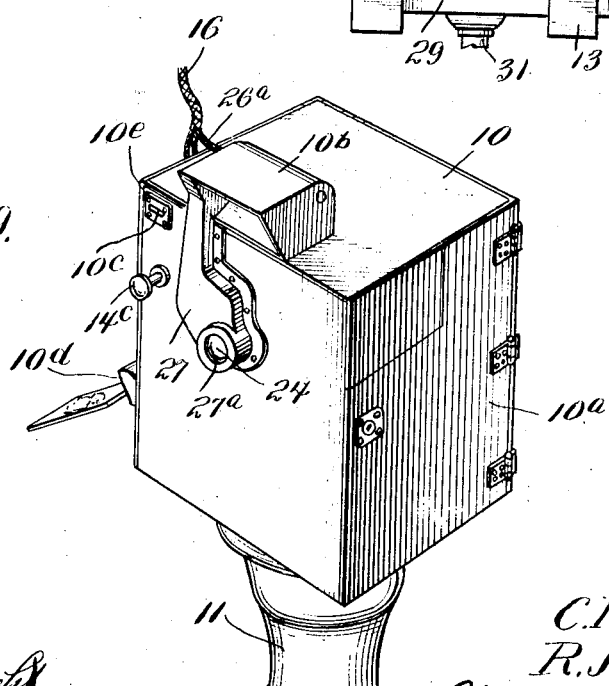
Inventors
C. F. Roth
R. A. Keller
By Victor J. Evans
Attorney
Witnesses

UNITED STATES PATENT OFFICE.

CLINTON F. ROTH AND ROBERT A. KELLER, OF ALLENTOWN, PENNSYLVANIA.

AUTOMATIC PHOTOGRAPHING AND DEVELOPING MACHINE.

1,177,539.  Specification of Letters Patent.  Patented Mar. 28, 1916.

Application filed September 22, 1914. Serial No. 862,999.

*To all whom it may concern:*

Be it known that we, CLINTON F. ROTH and ROBERT A. KELLER, citizens of the United States, residing at Allentown, in the county of Lehigh and State of Pennsylvania, have invented new and useful Improvements in Automatic Photographing and Developing Machines, of which the following is a specification.

The invention relates to photography, and has for an object to provide a device for automatically photographing an object or person upon a film or plate, developing the exposed film or plate and delivering the same to the purchaser.

The invention contemplates, among other features, the provision of a machine which is preferably adapted for use in amusement parks and the like, and which contemplates a structure adapted to operate when a coin is inserted in the casing of the machine, the device being preferably operated by electricity and entirely automatic in its operation of photographing a person or object upon the film or plate, developing or finishing the said film or plate and delivering the same to the purchaser or person whose photograph was taken.

Still further embodiments of the invention reside in a structure which can be made up in a compact form to take up very little room and which, if desired, can be conveniently mounted upon a stand to present a neat and effective appearance.

Figure 12:
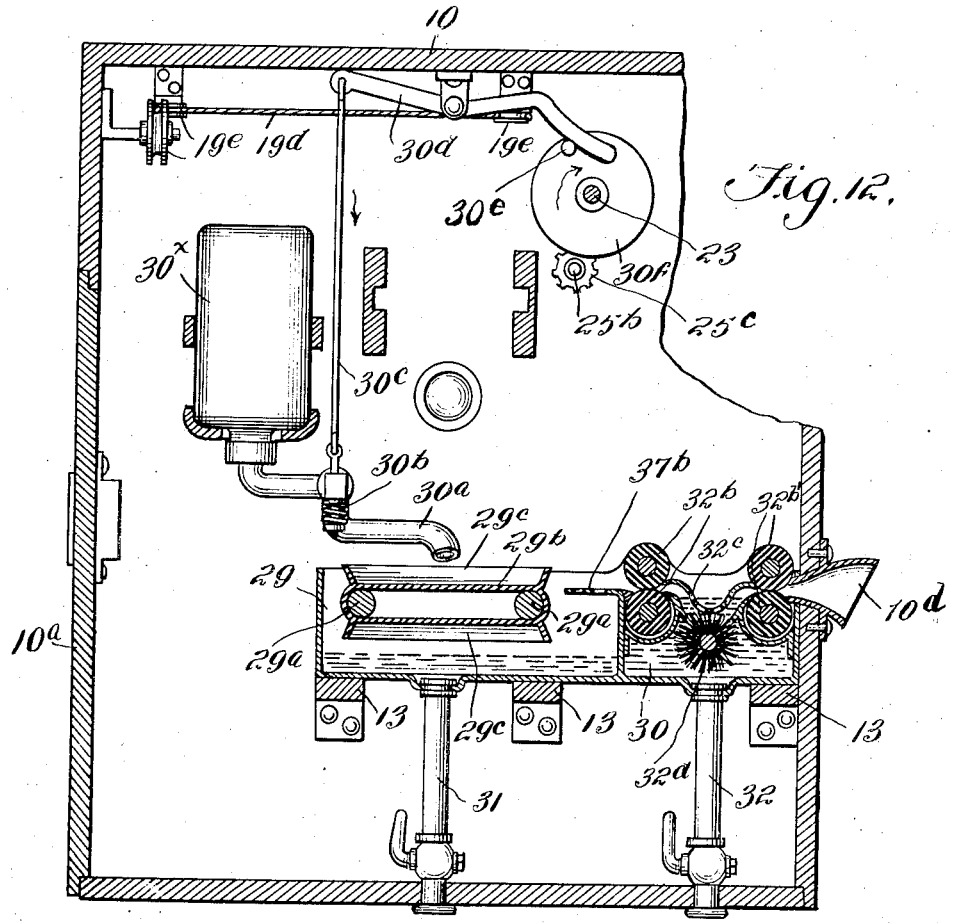
Figure 15:
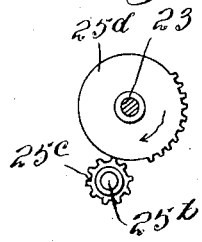
Figure 16:
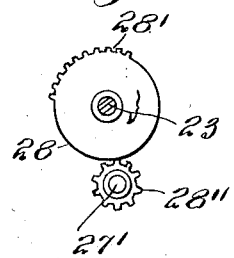
Figure 17:
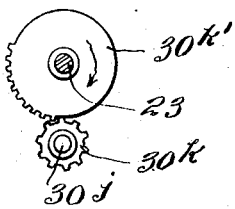

In the further disclosure of the invention reference is to be had to the accompanying drawings, constituting a part of this specification, in which similar characters of reference denote corresponding parts in all the views, and in which:

Figure 1 is a horizontal sectional view taken through the top of the box or casing, showing in plan the structural arrangement of the machine; Fig. 2 is a vertical sectional view taken on the line 2—2 in Fig. 1, looking in the direction of the arrow; Fig. 3 is a fragmentary vertical sectional view of the coin operated switch; Fig. 4 is a vertical transverse sectional view taken on the line 4—4 in Fig. 3, looking in the direction of the arrow; Fig. 5 is a vertical sectional view taken substantially on the line 5—5 in Fig. 1, looking in the direction of the arrow; Fig. 6 is a fragmentary side elevation of the magazine; Fig. 7 is a view looking at one end of the magazine, showing the operating mechanisms therefor; Fig. 8 is a fragmentary vertical longitudinal sectional view of the magazine, showing the manner of depositing a film or plate in the holder; Fig. 9 is a fragmentary horizontal sectional view taken on the line 9—9 in Fig. 1, showing the detail of the spring of the magazine; Fig. 10 is a horizontal sectional view taken through the plate or film holder; Fig. 11 is a fragmentary side elevation of a tank and holder, the dotted lines indicating the manner of depositing a film or plate in the tank; Fig. 12 is a fragmentary vertical sectional view of the tank, reservoir and cleaning devices; Fig. 13 is a vertical sectional view taken on the line 13—13 in Fig. 2; Fig. 14 is a fragmentary vertical longitudinal sectional view showing in detail the mechanism for operating the developing trays and cleaning device; Fig. 15 is a vertical sectional view taken through the shaft carrying the shutter and flash operating gear, said gear being shown in elevation; Fig. 16 is a vertical sectional view taken through the same shaft, showing the film holder operating gear, with the latter shown in elevation; Fig. 17 is a vertical sectional view taken through the same shaft, showing the film tank operating gear, the latter being shown in section; Fig. 18 is a perspective view of one of the cam like operating members; and Fig. 19 is a perspective view of the machine as it appears from the exterior when assembled.

Referring more particularly to the views, there is provided a box 10 supported on a suitable stand or upright 11, said box preferably having a side door 10ª and supporting on its top a suitable hood 10ᵇ, with a coin opening 10ᶜ formed in the front of the box, as clearly shown in Fig. 19, said box being further provided with an exterior hood 10ᵈ through which the finished picture is adapted to be projected into the hand of the user. A plate 10ᵉ borders the coin opening 10ᶜ and a coin chute 12 passes through the opening 10ᶜ and has its upper end terminating at the plate 10ᵉ, the lower end of the coin chute being arranged to depend into a coin box 12ª in the box 10 and which suitably supported in the box 10 and which coin box has connected thereto a coin chute 12ᵇ extending downwardly in the box 10 and communicating with a coin receptacle 12ᶜ supported on a suitable platform 13 in the box 10. The coin box 12ª has an electric wire 14 connected thereto and mounted to slide in the coin box is a plate 14ª to which is attached another electric wire 14ᵇ, said wires 14 and 14ᵇ connecting with a suitable motor 15 arranged within the box 10 and also connecting with a main circuit 16 passing outwardly from the box 10. A plunger 14ᶜ has a portion thereof projecting exteriorly of the casing and its inner end lying within the coin box 12ª, said plunger being held in normal position by a spring 14ᵈ. The plate 14ª carries a projection 14ᵉ and which is normally spaced from the inner end of the plunger 14ᶜ, said space being sufficient to permit the reception of a coin 14ᶠ therein. Now it will be clearly seen that when a coin is inserted in the coin slot or opening 10ᶜ said coin will pass downwardly through the coin chute and then into the box 12ª to lie between the inner end of the plunger 14ᶜ and the free end of the projection 14ᵉ. The lower end of the coin chute 12 and the upper end of the coin chute 12ᵇ are out of vertical alinement so that when pressure is applied to the exterior end of the plunger the coin 14ᶠ will be moved forwardly in the coin box to bear against the projection 14ᵉ, thus moving the plate 14ª forwardly into contact with the inner end of the coin box and to which is attached the wire 14, thus closing the electric circuit in the box 10 and resulting in the operation of the motor 15, while at the same time the coin, coming into alinement with the coin chute 12ᵇ, will gravitate into the same and be received in the coin receptacle 12ᶜ.

The rotation of the motor 15 results in the operation of the motor shaft 15ª, and which is suitably supported in the box 10 in journals 15ᵇ. A shaft 16ˣ journaled in the box 10 is connected with the motor shaft 15ª by a suitable chain 15ᶜ and a stub shaft 17 journaled in the box has connection with the motor shaft 15ª through the medium of a suitable chain 15ᵈ. Journaled in the box is another shaft 18 and which is connected by a chain 15ᵉ to the stub shaft 17, this construction being clearly seen in Figs. 2 and 5. Suitable toothed wheels 15ᶠ are carried by the various shafts 15ª, 16, 17 and 18 and over which the various chains mentioned operate in order to connect the shafts so that when the motor 15 is set in operation the said shafts will also be operated. It will be clearly seen, however, that by making the toothed wheels 15ᶠ larger or smaller as desired the shafts mentioned will operate at different speeds which object is particularly necessary in the accurate and proper operation of the machine.

A magazine 19 is arranged to slide upon a suitable floor or base 19ª supported in the box 10 and which is preferably provided with an opening 19ᵇ, said magazine 19 being subdivided into a series of compartments 19ᶜ in which are disposed plates 20 adapted to be individually received in a plate holder 21 arranged immediately beneath the opening 19ᵇ in the base 19ª. The magazine 19 is adapted to be advanced upon the base and to this end there is connected to the magazine a cord 19ᵈ which, passing over suitable pulleys 19ᵉ, has connection with the spring 19ᶠ arranged in the box 10 and which, exerting a pull on the cord, tends to slide the magazine 19 forwardly on the base 19ª. A rack 19ᵍ is arranged upon the magazine 19 and is normally engaged by a swingingly supported pawl 19ʰ supported on the base 19ª, and which is adapted to be operated by a lever 19ⁱ mounted to swing upon the base and adapted to be engaged by a pin 22ª projecting from a disk 22 carried on the shaft 18 which, journaled in the box 10, is connected by suitable gears 23ª with a shaft 23. Now it will be clearly seen that when the shaft 18 is rotated, thus imparting rotation to the disk 22, the pin 22ª, engaging the free end of the lever 19ⁱ, will actuate the pawl 19ʰ, thus disengaging the same from the rack 19ᵍ and permitting the magazine 19, through the medium of the pull exerted on the cord 19ᵈ, to advance a distance sufficient to permit one of the plates 20 to pass through the opening 19ᵇ and be deposited in the plate holder 21 arranged beneath the opening. The plate holder is so arranged that the plate, when received in the holder, will have its sensitized face in the horizontal plane of a lens 24, between which and the plate there is normally interposed a shutter (not shown) actuated by a shutter arm 25.

Arranged in the hood 10ᵇ is an electric incandescent or other form of lamp 26 which has suitable connection, by means of wires 26ª, with the exterior electric circuit 16, said lamp being adapted to be flashed by the operation of a suitable arm 26ᵇ connecting with a link 26ᶜ and which has pivotal connection with a bell crank lever 26ᵈ mounted to swing within the hood 10ᵇ. A casing 27 provided with an opening 27ª, is secured to the front of the box 10, said opening 27ª being in alinement with the lens 24 and said casing extending upwardly to connect with the hood 10ᵇ. The shutter arm 25 is arranged within said casing and has its free end eccentrically connected to a disk 25ª keyed upon a shaft 25ᵇ connected by means of suitable toothed wheels 25ᶜ and 25ᵈ, respectively, with the shaft 23 and whereby the rotation of the shaft will impart rotation to the disk 25ª, thus resulting in the operation of the shutter arm 25 at a predetermined moment and which is accurately determined by having some of the teeth on the toothed wheel 25ᵈ cut away therefrom so that the toothed wheel 25ᵈ will have teeth only on a portion of its periphery, which teeth, when meshing with the toothed wheel 25ᶜ, will result in the operation of the disk 25ᵃ, thus causing the operation of the shutter arm 25 and the resultant operation of the shutter. Connected with the shutter arm 25 at its point of connection with the disk 25ᵃ is an upwardly extending lever or arm 26ᵉ connecting with the free end of the bell crank lever 26ᵈ whereby the incandescent lamp 26 will emit a flash of light through the medium of the operation of the connection between the bell crank lever and the lamp, upon the rotation of the disk 25ᵃ and at the moment that the shutter of the lens is actuated, it being thus readily seen that at the moment the shutter is opened to expose the sensitized face of the plate in the plate holder, the lamp 26 will be flashed upon the person standing in front of the lens and whose picture is to be taken, thus resulting in the reproduction being properly received upon the sensitized face of the plate, it being further seen that after the shutter has been once operated and the lamp simultaneously flashed, said shutter operating mechanism and lamp operating mechanism will remain in stationary position in view of the fact that the toothed wheel 25ᵈ is partially stripped as mentioned heretofore and only operates when the few teeth thereon come in contact with the toothed wheel 25ᶜ carried by the shaft on which is arranged the disk 25ᵃ. It will now be apparent that after the shutter has been actuated the desired image or picture will have been transmitted to the sensitized face of the plate carried in the holder 21. A stud shaft 27′ is journaled in the box and by means of suitable beveled gearing 27 connects with a shaft 27ᵇ on which is mounted to turn a cam 27ᶜ, said shaft 27ᵇ being connected by suitable stripped gearing 28″ with the shaft 23. An operating rod or link 27ᵈ has pivotal connection with the cam 27ᶜ and connects with the plate holder 21. Thus in the rotation of the shaft 23 rotation will be imparted to the shaft 27′ and in turn the shaft 23 and cam 27ᶜ will be rotated to operate the link 27ᵈ and thus swing the plate holder 21 forwardly so that the plate will be ejected therefrom, as shown in Fig. 11, the detail construction of the plate holder being clearly shown in Figs. 8 and 10. It will be further seen that upon further rotation of the cam 27ᶜ the plate holder, after the plate has been ejected therefrom, will be returned to initial position as shown in full lines in Fig. 11, the dotted lines indicating the tilted position of the plate holder.

Supported on the platform 13 is a developing tank 29 and adjacent the developing tank there is provided a finishing tank 30, the developing tank 29 having an outlet pipe 31 and the finishing tank having an outlet pipe 32 extending exteriorly of the box 10. Journaled in the developing tank 29 are a plurality of rollers 29ᵃ over which passes a continuous belt 29ᵇ formed to provide a plurality of opposed trays 29ᶜ, the belt and trays being preferably formed of rubber, with the plate, when ejected from the plate holder as shown in Fig. 11, being adapted to be received in one of the trays 29ᶜ as shown in the last mentioned figure. Referring to Fig. 12, it will be seen that there is provided a reservoir 30ˣ having an outlet pipe 30ᵃ arranged above the developing tank so that the discharge will pass into one of the trays 29ᶜ, said discharge from the outlet pipe 30ᵃ being controlled by a suitable spring-actuated valve 30ᵇ to which is connected an operating rod 30ᶜ having pivotal connection with an operating link 30ᵈ pivoted on the box 10 and having one end thereof adapted to be engaged by a pin 30ᵉ on a disk 30ᶠ carried on the shaft 23 and adapted to rotate with the shaft to result in the operation of the link 30ᵈ and rod 30ᶜ and bring about the opening of the valve 30ᵇ so that a quantity of the developing fluid in the reservoir 30 will be discharged into one of the trays 29ᶜ when the pin 30ᵉ engages the link 30ᵈ, said valve 30ᵇ being spring-controlled to immediately close after being actuated, thus shutting off all further supply of developer to the tray.

One of the rollers 29ᵃ carries a grooved wheel 30ᵍ and which passes a continuous belt 30ʰ and which in turn passes around a grooved wheel 30ⁱ carried on a shaft 30ʲ which carries a toothed wheel 30ᵏ. At the moment that the plate has been received in the tray and a sufficient quantity of developing fluid discharged into the said try the developing action of the plate takes place and the tray is then advanced by the rotation of the roller having the heretofore mentioned connection with the shaft 23, thus advancing the tray to a position where, when the tray moves out of its horizontal plane to discharge its fluid contents into the developing tank, the developed plate will be received upon a ledge 37ᵇ on the finishing tank 30, said plate being advanced thereon by the advancement of the tray 29ᶜ so that the inner end of the plate will be received between a plurality of coacting rollers 32ᵇ journaled in the finishing tank, said plate being advanced between said rollers. When the plate is of a collapsible nature, such as a film, curved guideways 32ᶜ are provided in the finishing tank to guide the sensitized member into a quantity of water in the said tank. A brush is rotatably mounted in the tank and is indicated by the numeral 32ᵈ, said brush being adapted to act upon the surface of the plate or film to facilitate the finishing thereof, while it is being washed in the tank. The plate or film is then advanced between a plurality of co-acting rollers 32$^{b'}$ similar to the rollers 32$^b$ and then passes out from the box through the hood 10$^d$ to be delivered to the purchaser. The operating of the co-acting rollers 32$^b$ and 32$^{b'}$ is effected by means of suitable gearing 32$^e$ journaled in the box and connecting with the stud shaft 16 by a suitable chain or belt (not shown), said stud shaft 16 having connection with the motor 15 through the medium of the chain 15$^c$. Thus the rollers will be continuously operated and the brush, through the medium of the gear 32$^e$, is also continuously rotated so as to effectively act upon the film or plate when the same is received in the finishing tank, the said rollers operating to advance the film or plate to the tank and discharge the same through the discharge hood 10$^d$.

Referring now to Figs. 15, 16 and 17, it will be seen that in Fig. 15 is shown the partially stripped toothed wheel 25$^d$ meshing with the toothed wheel 25$^c$, said toothed wheel 25$^d$ being carried on the shaft 23. It is through the medium of this toothed wheel in its rotation that the shutter and flash are operated, and, referring now to Fig. 16, it will be seen that carried on the shaft 23 is the partially stripped gear 28' of the gearing 28 and which meshes with a toothed wheel 28'' carried on the shaft 27', thus in the rotation of the wheel 28'' effecting the operation of the plate holder whereby the plate will be ejected into one of the trays in the developing tank. Referring now to Fig. 17, it will be seen that the toothed wheel 30$^k$ meshes with a partially stripped toothed wheel 30$^{k'}$ carried on the shaft 23 and which, in its rotation, effects the advancement of the pliable belt and developing trays in the developing tank. Thus it will be apparent that by having various gears partially stripped the operation of each part of the machine is accomplished in a step by step process and as one part starts operating to accomplish one result and then stops, another part, through the medium of the partially stripped gear, is brought into play to effect the next step in the advancement of the plate or film and its subsequent finishing and developing to the end that the finished picture will subsequently be discharged through the discharge spout 33.

The plate or film, which is indicated by the numeral 20, is preferably so formed that it need not be, subsequent to its development, subjected to a printing process to bring out the picture, it being a plate or film having a sensitized composition thereon, which, when subjected to the action of a developing fluid and then finished, will have the picture itself represented upon the plate or film, something on the order of the well known daguerreotype and the like. Now referring to Figs. 1 and 2, it will be clearly apparent that when the last operation takes place, namely, the discharge of the plate or film through the discharge spout, it is necessary to bring the entire machine to a stop, with each part arranged in its initial position so that it can be subsequently operated to photograph and develop the next picture. It will be remembered that when the plunger 14$^c$ was initially actuated after the depositing of the coin in the coin box, the subsequent advancement of the plate 14$^a$ into contact with the inner end of the coin box closed an electric circuit, thus resulting in the operation of the motor. To break this circuit there is on the slowly rotating shaft 18 a disk or cam 34 carrying a beveled projection 34$^a$ which is adapted to engage a laterally projecting finger 34$^b$ on a spring-engaged rod 34$^c$ suitably journaled in a bearing 34$^d$ secured in the box and which rod 34$^c$ is insulated at its inner end and is adapted to be pushed against the contact plate 14$^a$ when the finger 34$^b$ is engaged by the projection 34$^a$ so that the insulated inner end of the rod 34$^c$ will move the contact plate 14$^a$ out of contact with the inner end of the coin box, thus breaking the circuit and resulting in the discontinuance of rotation of the motor, this operation resulting upon a complete revolution of the disk 34 and immediately after the plate or film has been ejected through the discharge spout 33. The machine will now be in initial position and ready to expose, develop, finish and deliver another plate to another prospective purchaser when said purchaser inserts a coin into the coin chute 12 and operates the plunger 14$^c$.

From the foregoing description it will be clearly seen that all of the parts of the machine co-act to produce the desired result, namely, a machine which is entirely automatic in its operation; which is preferably coin-controlled and whereby, upon the advancement of a coin into the machine and the initial operation of a single part thereof, all of the remaining parts will relatively co-act and coöperate through their mutual association to move the plate or film into proper position behind and in alinement with the lens; expose the plate or film by the operation of the shutter and the simultaneous operation of the flash light and then advance the plate or film into one of the trays of the developing tank to be acted upon by a quantity of developing fluid at this time ejected into the tray of the tank, after which the plate or film is advanced to pass between rollers in the nature of squeegees and then subjected to a washing and finishing operation, the last and final step being the discharge of the plate or film through the discharge spout into the hand of the purchaser, the entire machine being then automatically stopped and ready for the next picture.

Having thus described our invention, we claim:

1. An automatic photographing and developing machine comprising a box having a hood, a film magazine slidably supported for horizontal movement within the box and having a series of film compartments, a swinging film holder arranged below the magazine and adapted for registration with the compartments therein for successively receiving films therefrom, means for advancing the magazine, means for locking the magazine against advancement, developing and finishing tanks arranged below the film holder, movable trays supported within the developing tank, means for supplying developing fluid to said trays, means for advancing a film from each tray to one of the hoods for discharging said film from the box, driving means within the box and having connections for operating the film holder, trays and lock for the magazine, and means for starting and stopping the driving means.

2. An automatic photographing and developing machine comprising a box having a hood, a film magazine slidably supported for horizontal movement within the box and having a series of film compartments, a swinging plate holder arranged below the magazine and adapted for registration with the compartments therein for successively receiving films therefrom, means for advancing the magazine, means for locking the magazine against advancement, developing and finishing tanks arranged below the plate holder, movable trays supported within the developing tank, means for supplying developing fluid to said trays, means for advancing a film from each tray to one of the hoods for discharging said films from the box, driving means within the box and having connections for operating the plate holder, trays and lock for the magazine, means for starting and stopping the driving means, a lens on said box for exposing films within the plate holder, a second hood, an illuminating element arranged in said second hood, and means for flashing the illuminating element and adapted to control a shutter for the lens and operated by the driving means.

3. An automatic photographing and developing machine comprising a box having a hood, a film magazine slidably supported for horizontal movement within the box and having a series of film compartments, a swinging film holder arranged below the magazine and adapted for registration with the compartments therein for successively receiving films therefrom, means for advancing the magazine, means for locking the magazine against advancement, developing and finishing tanks arranged below the film holder, movable trays supported within the developing tank, means for supplying developing fluid to said trays, means for advancing a film from each tray to one of the hoods for discharging said film from the box, driving means within the box and having connections for operating the film holder, trays and lock for the magazine, means for starting and stopping the driving means, a lens on said box for exposing films within the film holder, a second hood, an illuminating element arranged in said second hood, means for flashing the illuminating element and adapted to control a shutter for the lens and operated by the driving means, and intermittently operable means for controlling the means for supplying the developing fluid to the trays and actuated by the connections with the driving means.

4. An automatic photographing and developing machine comprising a box having a hood, a film magazine slidably supported for horizontal movement within the box and having a series of film compartments, a swinging film holder arranged below the magazine and adapted for registration with the compartments therein for successively receiving films therefrom, means for advancing the magazine, means for locking the magazine against advancement, developing and finishing tanks arranged below the film holder, movable trays supported within the developing tank, means for supplying developing fluid to said trays, means for advancing a film from each tray to one of the hoods for discharging said film from the box, driving means within the box and having connections for operating the film holder, trays and lock for the magazine, means for starting and stopping the driving means, a lens on said box for exposing films within the film holder, a second hood, an illuminating element arranged in said second hood, means for flashing the illuminating element and adapted to control a shutter for the lens and operated by the driving means, intermittently operable means for controlling the means for supplying the developing fluid to the trays and actuated by the connections with the driving means, and means for operating the film holder to move the same from normal exposing position to ejecting position and operated by the driving means.

5. An automatic photographing and developing machine comprising a box having a lens in its front, developing and finishing tanks arranged within the box, means for feeding films from the developing tank to the finishing tank and also for automatically discharging such films from the box, movable developing trays arranged within the developing tank, means for supplying developing fluid to the trays, means operated by the driving means for controlling the supply of fluid from said means to the trays, a film holder swingingly supported in the box for supporting a film in the path of the lens and also for delivering it into the trays, a film magazine movable for communication with the film holder and adapted to successively feed films thereto, means for moving the film magazine, means for locking the magazine against movement, and means operated by the driving means for automatically releasing the said locking means.

6. An automatic photographing and developing machine comprising a box having a lens in its front, developing and finishing tanks arranged within the box, means for feeding films from the developing tank to the finishing tank and also for automatically discharging such films from the box, movable developing trays arranged within the developing tank, means for supplying developing fluid to the trays, means operated by the driving means for controlling the supply of fluid from said means to the trays, a film holder swingingly supported in the box for supporting a film in the path of the lens and also for delivering it into the trays, a film magazine movable for communication with the film holder and adapted to successively feed films thereto, means for moving the film magazine, means for locking the magazine against movement, means operated by the driving means for automatically releasing the said locking means, and means for starting the driving means and for automatically stopping the same.

7. An automatic photographing and developing machine comprising a box having a lens in its front, developing and finishing tanks arranged within the box, means for feeding films from the developing tank to the finishing tank and also for automatically discharging such films from the box, movable developing trays arranged within the developing tank, means for supplying developing fluid to the trays, means operated by the driving means for controlling the supply of fluid from said means to the trays, a film holder swingingly supported in the box for supporting a film in the path of the lens and also for delivering it into the trays, a film magazine movable for communication with the film holder and adapted to successively feed the films thereto, means for moving the film magazine, means for locking the magazine against movement, means operated by the driving means for automatically releasing the said locking means, means for starting the driving means and for automatically stopping the same, a hood on said box, illuminating means within said hood, and means operated by the driving means for controlling the illuminating means and also adapted to control a shutter for the lens.

In testimony whereof we affix our signatures in presence of two witnesses.

CLINTON F. ROTH.
ROBERT A. KELLER.

Witnesses:
WILLIAM R. KISE,
G. B. F. DIALY.